United States Patent Office 2,918,482
Patented Dec. 22, 1959

2,918,482
PROCESS OF PRODUCING CIS-TESTOSTERONE

André Allais, Paris, and Charles Hoffmann, Noisy Le Grand, France, assignors to Les Laboratoires Français de Chimiothérapie, Paris, France, a body corporate of France No Drawing. Application July 9, 1957
Serial No. 670,651

Claims priority, application France July 18, 1956

3 Claims. (Cl. 260—397.4)

This invention relates to cis-testosterone and to a method of making the same and more particularly the present invention relates to a method of preparing cis-testosterone

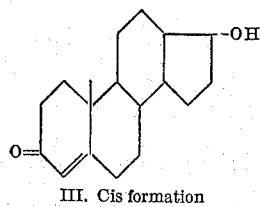

III. Cis formation by inversion of the hydroxyl group at the 17-position of trans-testosterone

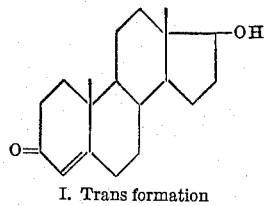

I. Trans formation after its tosylation.

Although the literature describes negative results when this inversion was attempted by acetolysis by means of silver or potassium acetate in the presence of acetic acid, it has now been found that this inversion can be carried out by acetolysis with an alkaline acetate in the presence of a disubstituted amide of a lower aliphatic acid such as dimethylformamide or dimethylacetamide and the like, the best results being obtained on refluxing the solvent, i.e., under conditions similar to those described in the applicants' application entitled "Method of Preparing α-Estradiol" of February 26, 1957, Serial No. 642,334, now Patent No. 2,835,681.

The cis-testosterone produced by saponification of its acetate is used in human and veterinary medicine as a retarding agent for the anterior lobe of the pituitary gland.

In practice, the trans-testosterone is tosylated by the action of tosyl chloride in the presence of a tertiary base, such as pyridine or methylethylpyridine and the like. The resultant trans-testosterone tosylate is then isolated from the reaction mixture by extraction with solvents, and, after evaporation of the extract, the tosylate

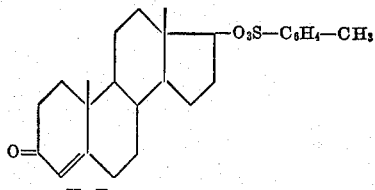

II. Trans testosterone tosylate is purified by recrystallization and subjected to acetolysis by the action of an alkaline acetate in the presence of boiling dimethylformamide or dimethylacetamide. The saponification of non-purified cis-testosterone acetate, obtained by extraction with solvents, leads directly to the desired cis-testosterone Formula III above.

The following examples serve to illustrate the invention without, however, limiting its scope. The yields produced with dimethylacetamide are identical with those produced in the presence of dimethylformamide and similar or equivalent alkyl or aryl carboxylic acid amides such as diethyl formamide, diethyl acetamide, dimethyl propionyl amide, and others. The melting points are instantaneous melting points determined on the Maquenne block. The formulas of the compounds are given hereinabove.

EXAMPLE 1

*Preparation of trans-testosterone tosylate, Formula II*

2.5 g. of commercial testosterone, I, and 2.5 g. of tosyl chloride are dissolved in 10 cc. of pyridine at room temperature. The solution is left to stand overnight. The next day, it is poured into 100 cc. of water, shaken, and hydrochloric acid is added until the Congo red paper turns blue.

After several minutes, the tosylate which has formed is extracted with chloroform, the chloroform solution is washed with water until neutral, is dried over anhydrous sodium sulfate, filtered and evaporated in vacuo to dryness. 10 cc. of isopropyl ether are added to the residual oil, and the solvent is then expelled in vacuo in order to eliminate the last traces of chloroform. The resultant trans-testosterone tosylate crystallizes. This yields after drying, 3.45 g. of the crude product, or a yield of 90%, which may be used as is for acetolysis.

After crystallization in ethyl acetate it takes on the form of colorless needles having the following characteristics: M.P.=174° C., $[\alpha]_D^{20}=+46°$ ($c=0.5\%$, ethanol). It is insoluble in water and ether, slightly soluble in alcohol when cold, soluble in acetone, benzene and chloroform, and soluble in 15 to 16 volumes of hot ethyl acetate.

Its analysis shows the formula as $C_{26}H_{34}O_4S$ and a molecular weight of 442.6.

As calculated:
    C=70.55%; H=7.74%; O=14.47%; S=7.24%.
As found:   C=70.4%; H=7.6%; O=14.4%; S=7.3%

This product has already been described by O. S. Madaeva and F. A. Lur'i, C.A., 1953, 3326c, who it may be noted were unable to carry out acetolysis with inversion of the hydroxyl.

EXAMPLE 2

*Acetolysis of trans-testosterone tosylate*

15 g. of trans-testosterone tosylate described in Example 1, having a M.P.=174° C., 7.5 g. of molten potassium acetate and 120 cc. of dimethylformamide are refluxed in an oil bath after about 5 cc. of water have been added so as to ensure complete dissolution of the potassium acetate. After seven hours of boiling, the formed yellow solution is allowed to cool and is poured into 1 liter of water; 200 cc. of normal hydrochloric acid are then added, and several extractions are carried out with methylene chloride. The combined organic extracts are then washed until the water is neutral, are dried over sodium sulfate and the solvent is evaporated in vacuo. The oily residue is directly subjected to saponification. For this purpose, it is taken up with 100 cc. of 95%-alcohol, and 10 cc. of a 50% potassium solution are added under a stream of nitrogen, and the solution is refluxed for two hours and evaporated in vacuo to dryness.

The brown residue is taken up with 250 cc. of water. It is then filtered, abundantly washed with water, thoroughly separated by centrifuging, empasted with isopropyl ether, filtered and washed with the same solvent. This produces, after drying, 3.3 g., or a yield of about 34%, of crude cis-testosterone. Treatment of the isopropyl(ic) mother liquors, evaporated to dryness, with boiling hexane and washing of the separated solid with benzene produces a second batch weighing 0.5 g. bringing the total yield of cis-testosterone to about 39%.

Recrystallization in ethyl acetate produces pure cis-testosterone having the following characteristics: M.P.= 219° C., $[\alpha]_D^{20} = +67° \pm 1.5°$ ($c=1\%$, ethanol), identical with the product described by L. Ruzicka and H. Kagi, Helv. Chim. Acta, 1936, 19, 842.

From the foregoing, it will be noted that by the present invention there is obtained a cis-testosterone by a process of inversion of the OH group in the 17-position of trans-testosterone. Furthermore, the new product obtained according to the hereinabove described method is useful in the field of human and veterinary medicine for treatment of the pituitary gland.

While a preferred method of tosylating trans-testosterone has been described and illustrated, it is to be noted that changes as to steps, procedure, arrangement and use of materials may be made without departing from the spirit and scope of the invention as claimed.

We claim:

1. In a process of producing cis-testosterone, the steps which comprise refluxing a solution of 17-tosyl trans-testosterone in dimethyl formamide with the addition of potassium acetate, isolating the resulting crude 17-acetyl cis-testosterone, refluxing said isolated 17-acetyl cis-testosterone in aqueous methanol with the addition of potassium hydroxide to cause saponification, washing the resulting cis-testosterone with water, triturating the washed compound with isopropyl ether, and recrystallizing the triturated compound from ethyl acetate to produce substantially pure cis-testosterone.

2. In the process of producing cis-testosterone having a melting point of 219° C. and a rotatory power of $[\alpha]_D^{20} = +67° \pm 1.5°$, the steps which comprise heating trans-testosterone with p-toluene sulfochloride in a tertiary amine to cause tosylation of said trans-testosterone, extracting the reaction product from the reaction mixture by means of a water-immiscible solvent, evaporating the extract, recrystallizing the resulting 17-tosyl trans-testosterone, dissolving the recrystallized 17-tosyl trans-testorterone in an acid amide selected from the group consisting of dimethyl formamide, diethyl formamide, dimethyl acetamide, diethyl acetamide, and dimethyl propionyl amide, adding an alkali metal acetate to the resulting solution, heating the reaction mixture to cause acetolysis, isolating the resulting 17-acetyl cis-testosterone, heating under reflux said 17-acetyl cis-testosterone in a lower alkanol with the addition of an alkali metal hydroxide to cause saponification, and recrystallizing the resulting crude 17-cis-testosterone.

3. The process according to claim 2, wherein the resulting cis-testosterone is recrystallized from a water-immiscible solvent selected from the group consisting of benzene, chloroform, ethyl acetate, and ether.

References Cited in the file of this patent

UNITED STATES PATENTS 2,835,681     Allais _____ May 20, 1958